United States Patent
Holland

[11] Patent Number: 5,874,052
[45] Date of Patent: Feb. 23, 1999

[54] ANTIMICROBIAL FILTER FOR USE IN ELECTROCAUTERY OR LASER SURGERY

[75] Inventor: Clint Holland, East Amherst, N.Y.

[73] Assignee: Medtek Devices, Inc., Amherst, N.Y.

[21] Appl. No.: 827,925

[22] Filed: May 5, 1997

Related U.S. Application Data

[63] Continuation of Ser. No. 221,552, Apr. 1, 1994, abandoned, which is a continuation of Ser. No. 883,348, May 15, 1992, abandoned.

[51] Int. Cl.⁶ .................................................... B01D 50/00
[52] U.S. Cl. ........................ 422/171; 422/122; 422/170; 96/153; 55/279; 55/486; 55/524
[58] Field of Search .................................. 422/122, 101, 422/168–171; 55/279, 486, 524; 96/153, 131

[56] References Cited

U.S. PATENT DOCUMENTS

| | | | |
|---|---|---|---|
| 4,210,429 | 7/1980 | Goldstein | 55/279 |
| 4,382,440 | 5/1983 | Kapp et al. | 55/316 |
| 4,602,011 | 7/1986 | West et al. | 514/187 |
| 4,604,110 | 8/1986 | Frazier | 422/122 |
| 4,631,297 | 12/1986 | Battice et al. | 422/122 |
| 4,682,992 | 7/1987 | Fuchs | 55/279 |
| 4,810,269 | 3/1989 | Stackhouse et al. | 55/319 |
| 4,826,513 | 5/1989 | Stackhouse et al. | 55/316 |
| 4,876,070 | 10/1989 | Tsukahara et al. | 422/122 |
| 4,906,261 | 3/1990 | Mohajer | 55/256 |
| 4,917,862 | 4/1990 | Kraw et al. | 55/279 |
| 4,986,839 | 1/1991 | Wertz et al. | 55/467 |
| 5,006,267 | 4/1991 | Vaughn et al. | 210/755 |
| 5,176,665 | 1/1993 | Watanabe et al. | 604/317 |
| 5,290,827 | 3/1994 | Shine | 523/340 |
| 5,296,238 | 3/1994 | Sugiura et al. | 423/311 |

*Primary Examiner*—Hien Tran
*Attorney, Agent, or Firm*—Phillips, Lytle, Hitchcock, Blaine & Huber LLP

[57] ABSTRACT

The present invention includes a filter, 10, for purifying smoke plume generated from electrocautery or laser surgery. The filter includes a pre-filter, 11, for filtering gross particulate; a first filter, 12, having a structurally blended antimicrobial agent and adapted to capture and destroy minute and harmful organic particles such as viruses or bacteria at high efficiency; a second filter, 13, having a charcoal bed for removing gaseous toxins and odors from the smoke plume and a post-filter, 14, adapted to complete the general filtering process and to control the migration of any charcoal fines or other filter elements. The filter is adapted to be used in connection with various filter containers or hoods, including a rectangular hood, 16, or an industry-standard cylindrical filtering container, 20. The invention further includes the method for producing the blended antimicrobial first filter through the casting of a polymer membrane, 30, from a solution of a solvent, 25, polymer, 24, and antimicrobial, 26, cast on a substrate, 28, and made the subject of controlled evaporation of the solvent, 29. Thereafter, the resulting polymer membrane, thoroughly diffused and blended with the antimicrobial, is formed into various filter shapes, 31.

13 Claims, 2 Drawing Sheets

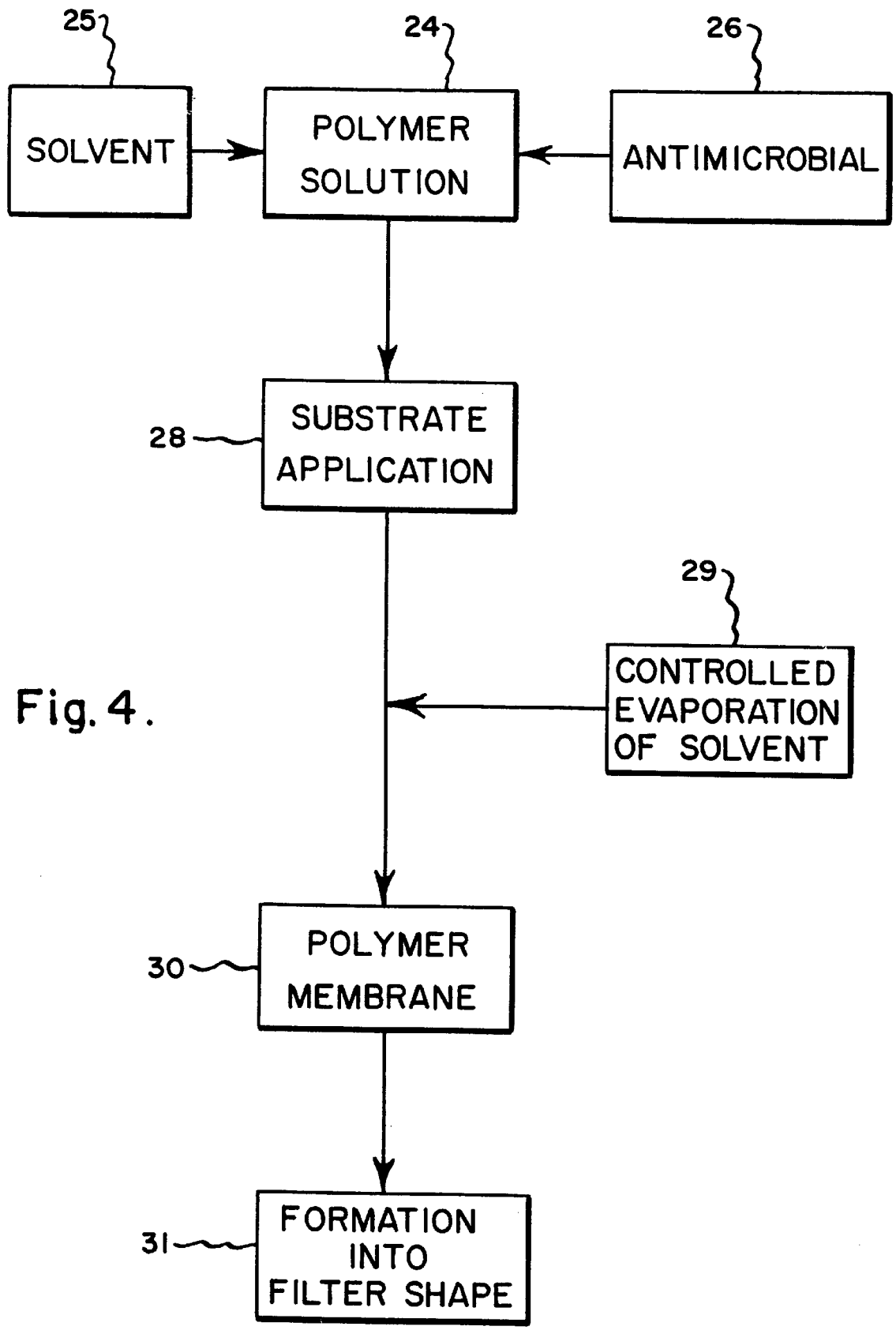

ial filter for use in
electrocautery or laser surgery

CROSS REFERENCE TO RELATED APPLICATIONS

This is a continuation of U.S. patent application Ser. No. 08/221,552 originally filed on Apr. 1, 1994, now abandoned, which was a continuation of prior U.S. patent application Ser. No. 07/883,348 filed May 15, 1992, now abandoned.

TECHNICAL FIELD

The present invention relates generally to the field of filters and filtration devices and more particularly, to a filter used in electrocautery or laser surgery to remove and destroy harmful microbes suspended in the smoke plume produced thereby.

BACKGROUND OF THE INVENTION

In recent years, there has been a tremendous increase in electrocautery and laser surgery for both complicated and simple procedures, including cancer therapy, gynecological surgery, vascular surgery and other areas of both invasive and topical therapies.

Moreover, the use of high energy lasers and various other electrocautery-type devices in the surgical field is expected to increase dramatically with the perfection of new techniques and equipment used in the field. While laser and electrocautery surgery have proved to be extremely beneficial surgical alternatives, the benefits must be weighed in light of the environmental problems caused by the smoke plume generated during the course of the procedures.

In particular, a laser or electrocautery device burns or vaporizes tissue, including harmful tissue, in the surgical area. This produces a smoke plume that may be toxic, odorous, filled with particulate and which may include harmful microbes such as bacteria or viruses. Absent an appropriate evacuation device, the smoke produced by electrocautery or laser surgery becomes suspended in the operating room environment and may prove extremely harmful or infectious to operating room personnel. Moreover, suspended smoke plume around the surgical area is also apt to obscure or hinder the surgeon's vision and ability to carefully and safely perform a particular procedure.

As a result, the known prior art includes various types of devices for venting or exhausting laser or electrocautery generated smoke plume from the surgical area typically using a suction device and an attendant conduit extending away from the surgical area. Most of these devices also include a plurality of filters for removing particulate, toxins and odors from the suctioned plume which is then typically exhausted as "clean air" back into the operating room environment. Examples of these systems are disclosed in U.S. Pat. No. 4,986,839 (Wertz), U.S. Pat. No. 5,047,072 (Wertz) and U.S. Pat. No. 4,906,261 (Mohajer).

Similarly, as set forth in the '261 patent, the known prior art has recognized the importance of detoxifying the smoke plume and effectively destroying micro-organisms such as bacteria and viruses that might prove extremely harmful to operating room personnel. For example, the '261 patent contemplates the use of an antimicrobial solution through which the smoke plume is circulated for killing germs or viruses and also, alludes to possible "impregnation onto a filter matrix" of an antimicrobial agent.

The solution to the micro-organism problem disclosed in the '261 patent, however, is both inefficient and impractical. In particular, the use of a bubbled solution is extremely cumbersome and inappropriate for operating room purposes wherein there must be an economical use of space and wherein potential spilling of solutions or toxins may be extremely problematic. Too, topical impregnation onto a filter matrix of an antimicrobial suffers from a number of deficiencies, including wear caused by high velocity suction, nonuniform dispersion of the antimicrobial, evaporation and generally ineffective distribution of the chosen antimicrobial sufficient to form a relatively efficient and lasting antimicrobial filter.

The present invention solves the problem of providing an antimicrobial filter without the inefficiencies attendant to wear, evaporation, and the like presented by the prior art. In particular, the present invention contemplates a filter formed of a polymer blended with an antimicrobial agent, internally and externally, resulting in a "self-contained" blended filter media that is both long-lasting and efficient. Such filter configuration permits all methods of particulate capture since the antimicrobial is dispersed homogeneously throughout the filter material and is not prone to wear, evaporation or ineffectiveness in certain critical areas.

The present invention, therefore, comprises a filter containing an antimicrobial produced by a blending process that solves the problems of the prior art and results in a long-lasting and effective filter for destroying harmful microbes suspended in the smoke plume generated from laser or electrocautery surgery.

BRIEF DESCRIPTION OF THE DRAWINGS

FIG. 4 is a process flow chart for the manufacture of an improved antimicrobial filter.

BRIEF DESCRIPTION OF THE INVENTION

Figure 1:
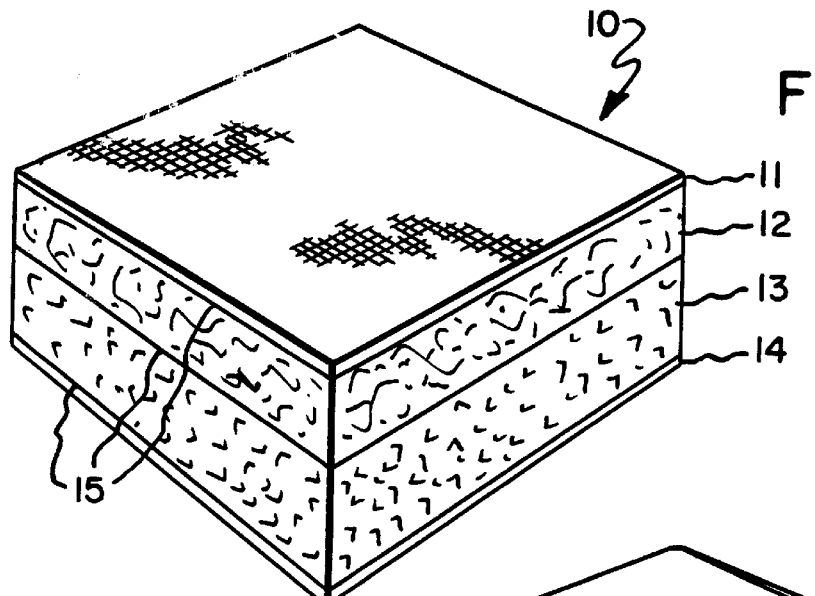
FIG. 1 is a prospective view of the improved antimicrobial filter.

With parenthetical reference to the various drawing figures, the present invention includes an improved antimicrobial filter device (e.g. 10) comprising a pre-filter (e.g. 11), a first filter (e.g. 12), a second filter (e.g. 13), and a post filter (e.g. 14) combined in series and appended together through the use of adhesive joints (e.g. 15).

The improved antimicrobial filter is generally contained in a disposable one-piece filter hood (e.g. 16) which includes, at its top portion, a suction hose opening (e.g. 19) for attachment of a smoke plume carrying conduit (not shown) from the surgical site.

The improved filter may also be incorporated into a cylindrical filter body (e.g. 20) having a front neck portion (e.g. 21), a rear neck portion (e.g. 22) and an inner hollow portion (e.g. 23) for containing the various filter elements in a cylindrical, rather than a rectangular embodiment.

An antimicrobial is blended into the first filter element (e.g. 12) through the use of a blending and casting process which includes the blending of a polymer solution (e.g. 24) and an appropriate solvent (e.g. 25) with a pre-selected antimicrobial (e.g. 26). The resulting blend is applied to a substrate (e.g. 28), and the solvent is then removed by controlled evaporation (e.g. 29). Polymer membrane (e.g. 30) remains after evaporation and includes a homogeneous diffusion of the antimicrobial agent throughout. The resulting polymer membrane is then formed into various filter shapes (e.g. 31) depending on the particular specification required.

Accordingly, the primary object of the invention is to provide a filter having an antimicrobial for use in surgical smoke evacuation systems.

Still another object of the invention is to provide a filter wherein the antimicrobial agent is blended throughout the filter media through the use of an appropriate manufacturing process.

Yet another object of the invention is to provide a blended antimicrobial filter that is not prone to evaporation, wear or breakdown through extended use.

These and other objects of the invention will become apparent from the foregoing and ongoing specification and claims.

MODE(S) OF CARRYING OUT THE INVENTION

At the outset, it should be clearly understood that life reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention generally comprises a filter, 10, comprised of a series of filter elements, 11,12,13 and 14, for capturing particulate, toxins, odors and, importantly, capturing and killing harmful microbes present in the smoke plume produced by electrocautery or laser surgery.

In particular, the filter comprises a pre-filter, 11, adapted to capture large particles of 0.5 micrometers or greater; a first filter 12, arranged in series with the pre-filter and adapted to capture particulate and microbes of 0.01 micrometer or greater in size and to destroy the microbes upon contact; a second filter, 13, arranged in series with the pre-filter and first filter, adapted to remove odors and toxins from the smoke plume; and a post-filter, 14, adapted to prevent migration of the remaining filter elements, including those comprising the second filter. Each of the filters is held in place by a series of adhesive joints, 15, interposed between the "sandwiched" filter layers.

The invention further includes a process for manufacturing the first filter and for blending the chosen antimicrobial agent uniformly and homogeneously throughout the first filter media. In particular, the process includes combination of a solvent, 25, polymer solution, 24, and an antimicrobial, 26, into a single blend for deposit upon a substrate, 28. Through controlled evaporation 29, a resulting polymer membrane, 30, is formed having an equal and diffuse dispersion of blended antimicrobial and which may be formed into various filter shapes at the last step of the process, 31.

The filter, 10, is used in connection with a plume evacuation system (not shown) for removing smoke plume generated by laser or electrocautery surgery and for purifying the same. The systems, well known in the prior art, generally include a conduit for evacuating the smoke from the surgical area that is connected to a suction device capable of drawing the smoke through the conduit and through the enclosed filter elements for purification. The smoke is then returned to the air of the operating room as "clean air." The filtering elements are generally resident within the equipment and may be disposed of when worn, damaged or used up.

Adverting in particular to FIG. 1, the filter, 10, is shown to be comprised of four distinct layers of substantially rectangular shape joined by adhesive joints, 15, in a series or "sandwich" form. Pre-filter, 11, is arranged at the top of the "sandwich" and is the first filter that the suctioned smoke plume contacts after removal from the surgical area. Pre-filter 11, in the preferred embodiment of the invention, is a non-woven polyester mesh of approximately 0.25 inches in thickness and is adapted to remove certain toxins or particulate in excess of 0.5 micrometers in size from the plume. The pre-filter acts as a filtration device for "gross" particulate suspended in the plume. Although harmful microbes such as bacteria or viruses will generally be smaller in size than the optimum capture capability of the pre-filter, the pre-filter may be topically coated with an antimicrobial in an effort to destroy any harmful microbes that might contact the filter surface, whether captured or otherwise.

Continuing to advert to FIG. 1, the first filter, 12, of substantially rectangular shape, is shown to be operatively arranged under and in series with pre-filter 11. Accordingly, smoke plume will next contact the first filter after passing through the pre-filter mesh. The plume, at this point, should be effectively filtered of all larger particulate (i.e., greater than 0.5 micrometers) and accordingly, the first filter is adapted to capture much finer particles, including harmful microbes such as viruses or bacteria. In particular, the first filter is generally an Ultra Low Penetration Air filter (ULPA) which, in the preferred embodiment is comprised of a specially configured polymer membrane adapted to capture particulate of 0.01 micrometers with an efficiency of 99.9999% removal. The polymer membrane can be formed of various polymer materials, including, but not limited to, cellulose acetate, cellulose esters, cellulose nitrate, polyacrylonitrile, polyvinylchloride, polysulphone, polypropylene or cellulose triacetates. The recited polymer membranes are fine enough to capture particulate in the ultra low penetration range which necessarily includes harmful microbes such as viruses, bacteria or the like.

The first filter polymer membrane is specially blended to include an antimicrobial agent (e.g. an organometallic, such as tin, or any one of the family of gluteraldehydes) blended and homogeneously diffused throughout the polymer membrane forming the filter component. As set forth below, and in FIG. 4, the chosen antimicrobial is specifically made a part of the polymer membrane manufacturing process to ensure complete, diffuse and homogeneous blending of the antimicrobial for efficient destruction of any contacted viruses, bacteria or microbes.

The blending of the antimicrobial differs markedly from the topical approach set forth in the prior art and solves the problems of the prior art with regard to excessive wear, uneven distribution of antimicrobial agents, blow or wash off of the antimicrobial agent, decreased efficiency and general unreliability of the ULPA and antimicrobial components of the known filters.

As is well known in the art, capture and destruction of harmful microbes through the use of an antimicrobial is accomplished through various methods for capture of particles by filter media. In essence, each method of capture and resulting destruction involves contact between the filter media and the particular harmful microbe. For example, a particular microbe may be captured by inertial impaction which comprises direct capture on the solid media surface of the filter. Similarly, harmful microbes may also be captured by interception within the structure of the filter media primarily arising from the size differential between the filter media structure and the captured particle. Large particles may also be captured by sedimentation which, in effect, uses the force of gravity to settle suspended particles onto the filter media. Too, charges on the filter media and generated particle forces may prove attractive and result in the capture of harmful microbes through electrostatic forces. Each of the recited capture mechanisms, together with others known in the art (e.g., Brownian diffusion), provides contact between the harmful microbe and a portion of the filter media. Accordingly, it is critical that the antimicrobial agent be evenly and homogeneously dispersed throughout all exposed areas of the media to effectively destroy all microbes that might prove harmful if allowed to penetrate the filter without destruction. Accordingly, topical application of an antimicrobial or, alternatively, bubbling of an antimicrobial liquid, as is known in the prior art, is extremely ineffective in practice. The present invention, however, on account of the homogeneous and complete diffusion and blending of the antimicrobial into the filter structure, does not suffer from these deficiencies. Contact can occur anywhere on the exposed media structure, or internally, and attendant capture and destruction will result.

Continuing to advert to FIG. 1, the second filter is shown to be substantially rectangular in shape and to be below and in series with the pre-filter and first filter in the filter "sandwich." The second filter is generally comprised of an activated charcoal bed, including charcoal fines, primarily for removing odors or toxins from suspended smoke plume gases. While the use of charcoal beds to remove odors is well known in the filtering art, use of a charcoal bed in series with the first ULPA filter with attendant blended antimicrobial further enhances the capability of the second filter to remove odors and toxins. In particular, inefficient removal or destruction of harmful microbes by the first filter results in the microbes escaping through the filter media into the charcoal bed of the second filter. As these microbes grow and divide, odors are emitted thereby placing an increased burden on the activated charcoal bed. Accordingly, efficient destruction of the microbes results in concomitant improved odor and toxin removal by the charcoal bed. Moreover, since the odor-removing burden on the charcoal bed is greatly diminished, the life expectancy and efficiency of the bed also increases dramatically.

Continuing to advert to FIG. 1, post-filter 14 is shown to be a substantially thin (i.e., approximately one-quarter inch thick) substantially rectangular member at the bottom of the filter "sandwich." Accordingly, the post-filter is the last filter through which the plume passes prior to being exhausted back into the operating room atmosphere. In the preferred embodiment, the post-filter generally comprises a polymer foam adapted to capture any remaining particulate, including harmful microbes. Accordingly, the post-filter may also be topically coated with an antimicrobial agent, if desired. Another primary function of the post-filter is to provide a barrier inhibiting migration of the charcoal bed fines from the second filter that can result from the constant suction produced by the evacuation system. Accordingly, the post-filter ensures the integrity of the important charcoal bed portion of the filter "sandwich" and increases the wear capability and life expectancy of the filter mechanism as a whole.

Figure 2:
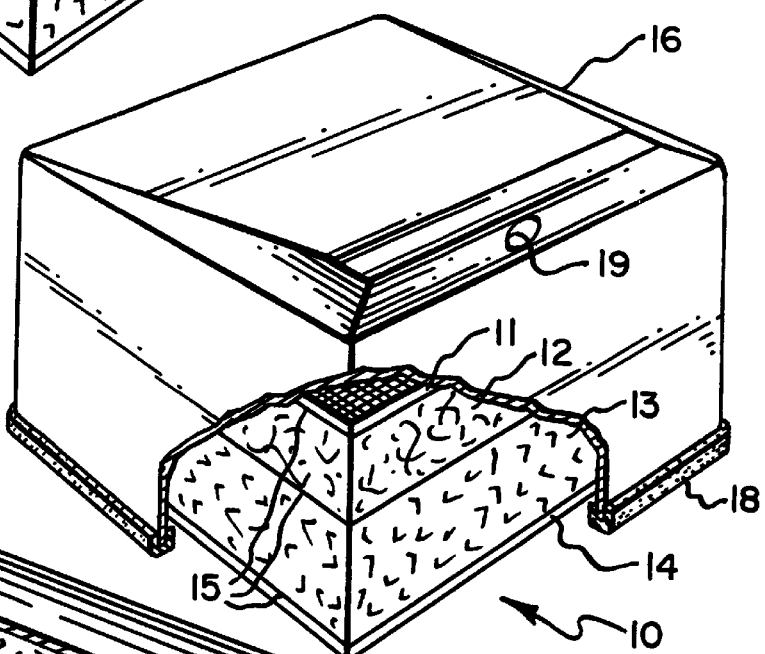
FIG. 2 is a partial fragmentary perspective view of the improved antimicrobial filter shown in a rectangular filter case.
Figure 3:
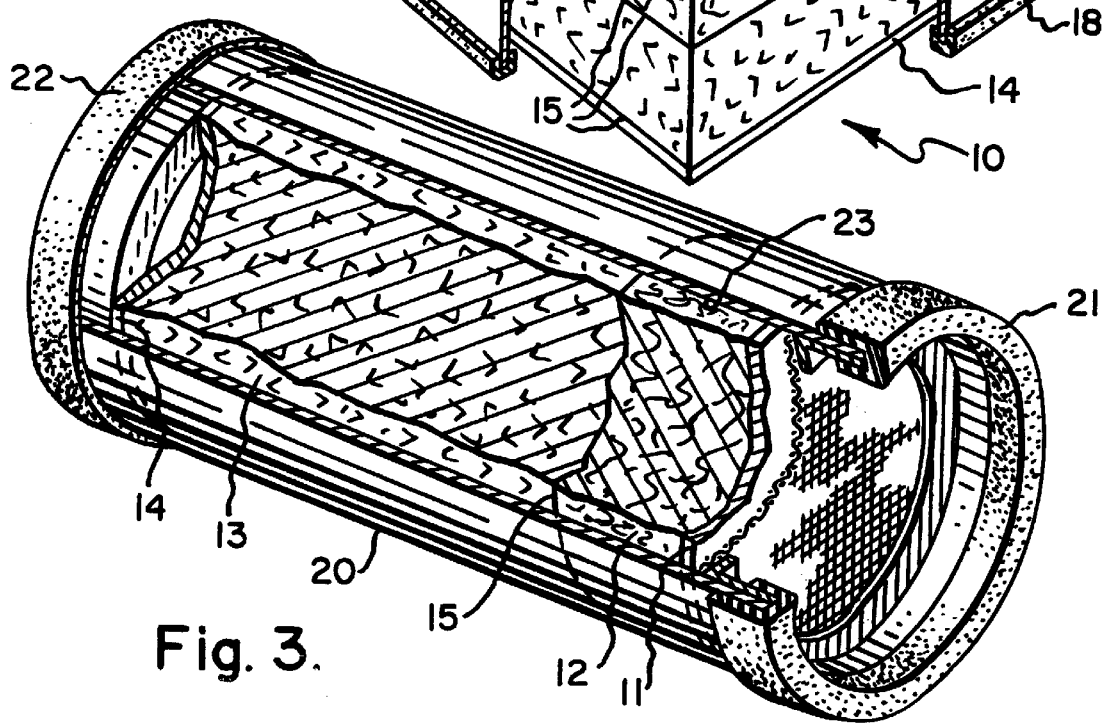
FIG. 3 is a partial fragmentary perspective view of an improved antimicrobial filter shown in a cylindrical case.

As shown in FIG. 1, the various filter components are held together by extremely thin and adhering adhesive layers, 15, therebetween. Similarly, as shown in FIGS. 2 and 3, the filter elements may be formed in various shapes, aside from the rectangular shape of the preferred embodiment. In FIG. 2, a rectangular filter casing hood 16 is shown to include the rectangular filter elements of FIG. 1. The hood further includes an entry port, 19, which ultimately would be connected to a conduit (not shown) leading to the surgical site. Accordingly, the smoke plume would initially enter port 19 be suctioned through and for passing through the enclosed filter elements. A bottom surface surrounded by a tight fitting gasket, 18, encases the filter and will generally include an out-port (not shown) through which the filtered plume is distributed through the evacuation system back into the operating room atmosphere.

Adverting to FIG. 3, another embodiment of the filter is shown encased in a cylindrical housing, 20. Many evacuation systems known in the art are receptive to a cylindrical filter housing that may be easily replaced after an expected number of uses. The cylindrical housing generally includes an entry collar 21 through which the plume is initially suctioned, an inside hollow portion, 23, providing a space for interposition of the filter elements and suctioned smoke plume; the series-arranged filter elements in cylindrical shape, 11, 12, 13 and 14; and an exit collar 22, providing an exit port for the filter and purified air. Accordingly, the present invention may be readily adapted for filter mechanisms of a variety of sizes and shapes known in the art.

In the preferred embodiment, hood 16 may be formed of plastic or other easily disposable material and accordingly, upon disposal, it may not be necessary to even contact the enclosed filter elements, including any destroyed or captured microbes. The filter, on account of its disposable or biodegradable characteristics, is merely properly incinerated or disposed of and a new filter put into position.

Adverting now to FIG. 4, the process used to manufacture the first filter and to ensure thorough and diffuse blending of the antimicrobial is illustrated in flow chart form. In particular, the process generally provides for a polymer solution, 24, blended with an appropriate solvent medium, 25, and with approximately 0.1 to 0.5 percent by volume of a selected antimicrobial agent, 26. The resulting solution is thoroughly blended and mixed to ensure even distribution of the antimicrobial throughout the blend and is then applied to a preselected substrate, 28, for casting of the antimicrobial polymer membrane. After application to the substrate, the solution solvent is removed through controlled evaporation, 29, and accordingly, a polymer membrane, 30, having a completely blended and diffused antimicrobial agent therein is formed. Thereafter, the antimicrobial polymer membrane is formed into specific or chosen shapes, 31, for interposition into a selected filter "sandwich."

It is also contemplated that fibrous materials such as micro fiberglass, polypropylene or modified acrylics may also be blended with an antimicrobial to achieve identical diffuse and homogeneous blending of the antimicrobial agent. Specifically, in the process of making organic fiber filtration media, the polymer materials are extruded into fine fibers for ultimate compaction or weaving into a filter element. Prior to extrusion, however, the plastics are melted with a solvent, and accordingly, as illustrated in general in FIG. 4, an antimicrobial can be added to the melted and dissolved plastic and solvent prior to extrusion. After extrusion of the fibers, however, the blended antimicrobial will be present in a diffuse and homogeneous manner capable of the same efficient capture and destruction of microbes as in the polymer filter described in the preferred embodiment.

In operation, the filter device is enclosed in an appropriate container or hood and interposed into a suction plume evacuation system. The smoke plume generated by the laser or electrocautery surgery is then suctioned through a conduit away from the surgical area and is passed through the filter in series. The pre-filter is adapted to capture large particles suspended in the plume and may include a topical application of an antimicrobial agent to destroy any randomly captured harmful microbes. The plume is then continuously evacuated into the first filter, an ULPA polymer membrane in the preferred embodiment blended homogeneously with an antimicrobial agent through the use of the process described in FIG. 4. The first filter is adapted to capture minute particles, including viruses, bacteria and other microbes, with extremely high efficiency, and the blending of the antimicrobial into the filter structure and material ensures highly efficient destruction of any captured microbes. Continuous suctioning results in the plume being next passed through a charcoal bed which, as its primary function, removes any remaining odors or gaseous toxins suspended in the plume. A final post-filter of polymer foam completes the filtration process through the capture of any other random particulate, odors or microbes and may be topically treated with an antimicrobial. The resulting purified air is then exhausted back into the operating room environment.

The blending of the antimicrobial into the first filter element results in enhanced efficiency in operation of the destruction of microbes. The improved filter, manufactured by the blending process, ensures complete and diffuse dispersion of the antimicrobial throughout the filter structure and, in addition, results in a filter not prone to rapid wear, erosion of the antimicrobial, uneven dispersion or other impediments typically experienced in the prior art. Accordingly, destruction of the microbials is, in effect, completely accomplished without the need for additional filtering.

Too, the manufacturing process ensures that the blended antimicrobial first filter can be formed into various sizes and shapes for easy adaptation and use with various plume evacuation systems and filter containers or hoods.

MODIFICATIONS

Although the invention is described in terms of a preferred embodiment therefor, one of ordinary skill in the art will readily appreciate that various modifications and changes may be made to the invention without departing from the concept illustrated by the specification, drawings and appended claims.

In particular, the invention contemplates the use of various filtering materials or processes for blending preselected antimicrobials homogeneously and evenly into the filter structure.

Similarly, while the preferred embodiment comprises a filter "sandwich" of four layers, other or fewer layers may be devised to sufficiently filter a known smoke plume.

The present device may also be adapted for easy use outside the scope of the operating room and may be adapted for use in other filtering environments where harmful or potentially harmful microbes or suspended particulate may exist.

These and other modifications would be apparent to one of ordinary skill in the art and accordingly, the invention should be read in light of the specification, drawings and appended claims, together with the knowledge and skill in the art.

We claim:

1. A filter for use with an electrocautery or laser surgical device and smoke plume evacuation system for filtering particulate, gases, harmful microbes and odors suspended in the smoke plume generated thereby, comprising:

a pre-filter operatively arranged to initially contact a generated smoke plume and to capture suspended particulate;

a first filter operatively arranged adjacent to said pre-filter, and further constructed and arranged to capture and kill harmful microorganisms suspended in the smoke plume, said first filter further comprising a filter media, said filter media comprising filter strands, each filter strand being a compound including a polymer and an organometallic antimicrobial agent commingled homogeneously with one another throughout each said filter strand, said organometallic antimicrobial agent not prone to erosion from said filter media, and said filter media adapted to kill microorganisms passing therein;

a second filter operatively in series with said pre-filter and said first filter, said second filter comprising activated charcoal constructed and arranged to remove gases and odors in the smoke plume;

a post-filter operatively in series with said pre-filter and said first and second filters and constructed and arranged to prevent migration of said second filter activated charcoal;

whereby the smoke plume is detoxified for safe release and wherein infectious microbes suspended in the smoke plume and captured in said filter are destroyed.

2. The device according to claim 1 wherein said pre-filter is a polyester non-woven mesh of approximately 0.25 inches in thickness constructed and arranged to capture particulate suspended in the smoke plume of larger than 0.5 micrometers.

3. The device according to claim 1 wherein said first filter is an ultra low penetration air filter constructed and arranged to capture and destroy particulate microbes of 0.01 micrometers at 99.9999% efficiency.

4. The device according to claim 1 wherein said first filter is an ultralow penetration air filter comprised of a polymer membrane.

5. The device according to claim 1 wherein said second filter is an activated charcoal bed having charcoal fines therein.

6. The device according to claim 1 wherein said post-filter comprises a polymer foam filter media.

7. The filter described in claim 1 wherein said organometallic antimicrobial agent has a metallic portion and wherein said metallic portion includes tin.

8. A filter media for use in cleaning air flows having entrained contaminates, comprising:

filter strands, each filter strand being a compound including a polymer and an organometallic antimicrobial agent commingled homogeneously with one another throughout each said filter strand, said organometallic antimicrobial agent not prone to erosion from said filter media, and said filter media adapted to kill microorganisms passing into said filter media.

9. The filter media described in claim 8 wherein said organometallic antimicrobial agent has a metallic portion and wherein said metallic portion includes tin.

10. A filter for use with an electrocautery or laser surgical device and smoke plume evacuation system for filtering particulate, gases, harmful microbes and odors suspended in the smoke plume generated thereby, comprising:

a pre-filter operatively arranged to initially contact a generated smoke plume and to capture suspended particulate;

a first filter operatively arranged adjacent to said pre-filter, and further constructed and arranged to capture and kill harmful microorganisms suspended in the smoke plume, said first filter further comprising a filter media, said filter media comprising filter strands, each filter strand being a homogeneous diffusion of a polymer and an organometallic antimicrobial agent throughout each said filter strand, said organometallic antimicrobial agent not prone to erosion from said filter media, and said filter media adapted to kill microorganisms passing therein;

a second filter operatively in series with said pre-filter and said first filter, said second filter comprising activated charcoal constructed and arranged to remove gases and odors in the smoke plume;

a post-filter operatively in series with said pre-filter and said first and second filters and constructed and arranged to prevent migration of said second filter activated charcoal;

whereby the smoke plume is detoxified for safe release and wherein infectious microbes suspended in the smoke plume and captured in said filter are destroyed.

11. The filter described in claim 10 wherein said organometallic antimicrobial agent has a metallic portion and wherein said metallic portion includes tin.

12. A filter media for use in cleaning air flows having entrained contaminates, comprising:

filter strands, each filter strand comprising a homogeneous diffusion of a polymer and an organometallic antimicrobial agent throughout each said filter strand, said organometallic antimicrobial agent not prone to erosion from said filter media, and said filter media adapted to kill microorganisms passing into said filter media.

13. The filter media described in claim 12 wherein said organometallic antimicrobial agent has a metallic portion and wherein said metallic portion includes tin.

* * * * *